Feb. 11, 1958  K. E. MUSSLER  2,822,858
SWIVELED FRONT SEAT FOR AUTOMOBILES
Filed June 23, 1955  3 Sheets-Sheet 1

Inventor:
Kurt Erich Mussler
By Gary, Desmond & Parker
Attys.

Feb. 11, 1958  K. E. MUSSLER  2,822,858
SWIVELED FRONT SEAT FOR AUTOMOBILES
Filed June 23, 1955  3 Sheets-Sheet 2
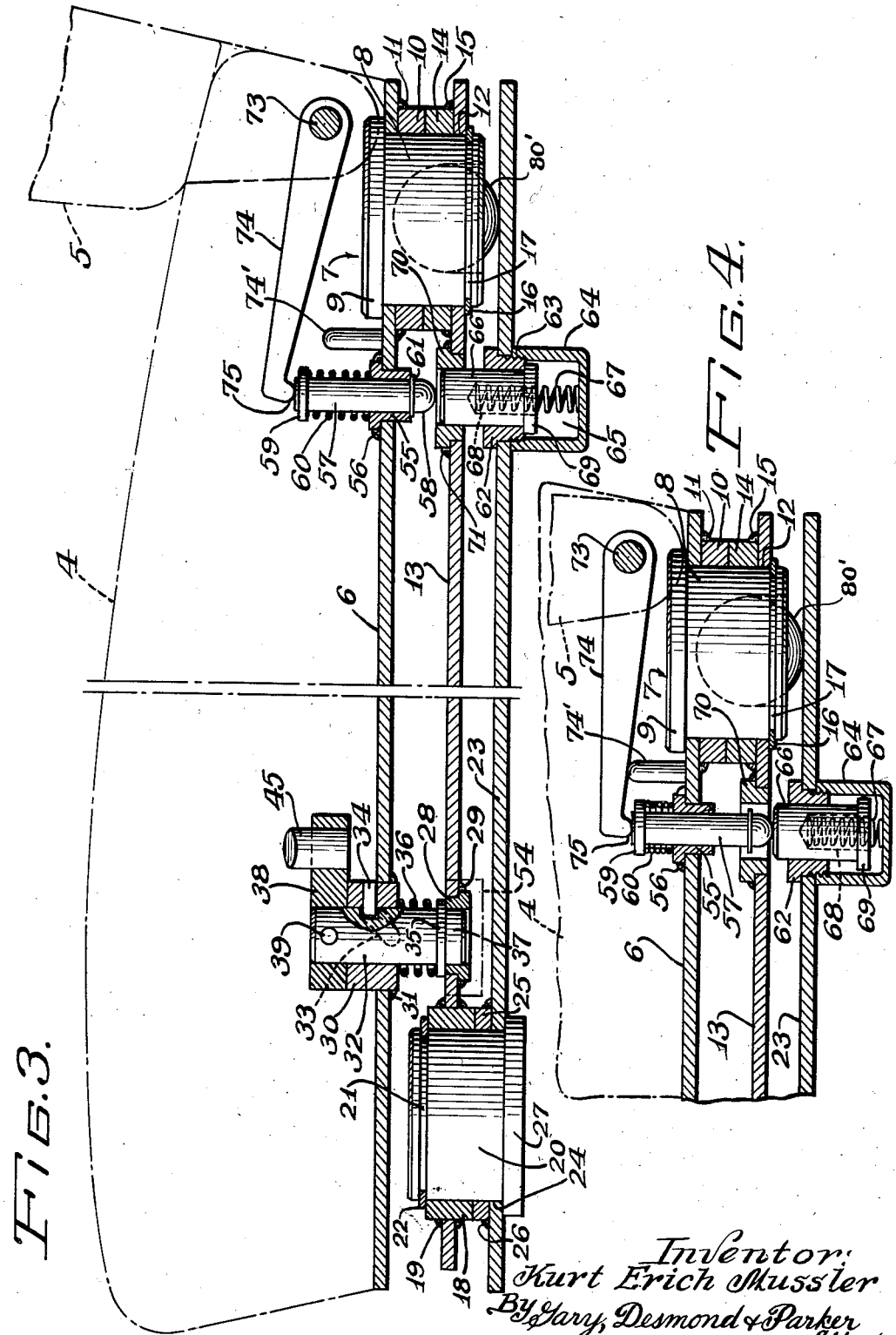
Inventor:
Kurt Erich Mussler
By Gary, Desmond & Parker
Attys.

Feb. 11, 1958 K. E. MUSSLER 2,822,858
SWIVELED FRONT SEAT FOR AUTOMOBILES
Filed June 23, 1955 3 Sheets-Sheet 3
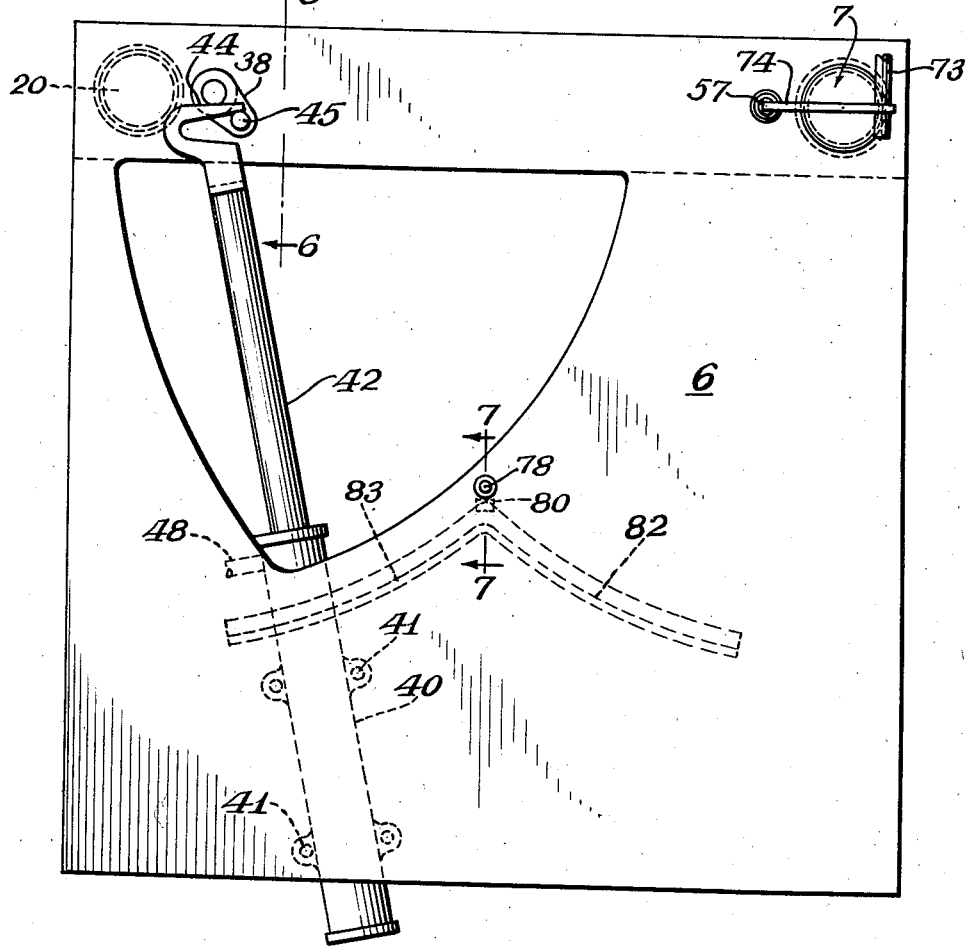
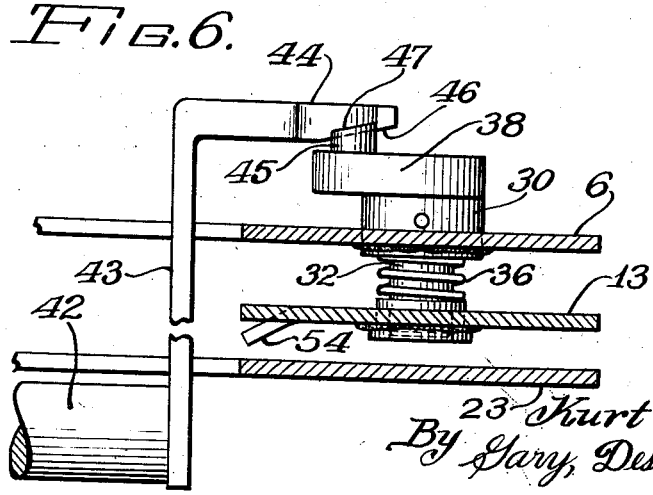
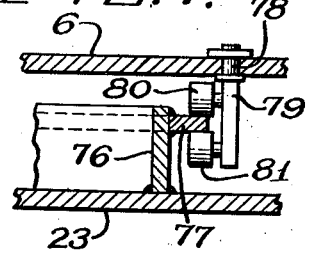
Inventor:
Kurt Erich Mussler
By Gary, Desmond & Parker
Attys.

United States Patent Office 2,822,858
Patented Feb. 11, 1958

2,822,858

SWIVELED FRONT SEAT FOR AUTOMOBILES

Kurt Erich Mussler, Chicago, Ill.

Application June 23, 1955, Serial No. 517,564

7 Claims. (Cl. 155—5)

This invention relates to improvements in automobile seats, particularly the front seats of automobiles, and refers specifically to a front seat of a passenger automobile which is swivel-mounted permitting the seat to be swung to different positions to permit more convenient maneuvering of the passenger in entering and leaving the automobile.

One of the important objects of the present invention resides in a swivel-mounted front seat of an automobile whereby a passenger entering or leaving the front compartment of the automobile may, while in a sitting position on the seat, swing with the seat to position his feet and legs either over the floorboard of the vehicle or over the ground or pavement immediately adjacent the side of the vehicle.

Another important feature of the invention resides in the provision of a double swiveled front seat of an automobile, of the two-door or so-called "coach" type wherein rear seat passengers must enter and leave the automobile through the doors adjacent the front seats of the vehicle, which permits the front seats to be swung to a position making entry and leaving of the vehicle most convenient.

Other objects and advantages of the present invention will be apparent from the accompanying drawings and following detailed description.

In the drawings:

Fig. 3 is an enlarged sectional view taken on line 3—3 of Fig. 1.

Fig. 4 is a fragmentary view of a portion of the device illustrated in Fig. 3 showing a different position of the parts.

Fig. 5 is an enlarged top plan view of the upper seat rest plate.

Fig. 6 is an enlarged detailed sectional view taken on line 6—6 of Fig. 5.

Fig. 7 is an enlarged detailed sectional view taken on line 7—7 of Fig. 5.

Figure 1:
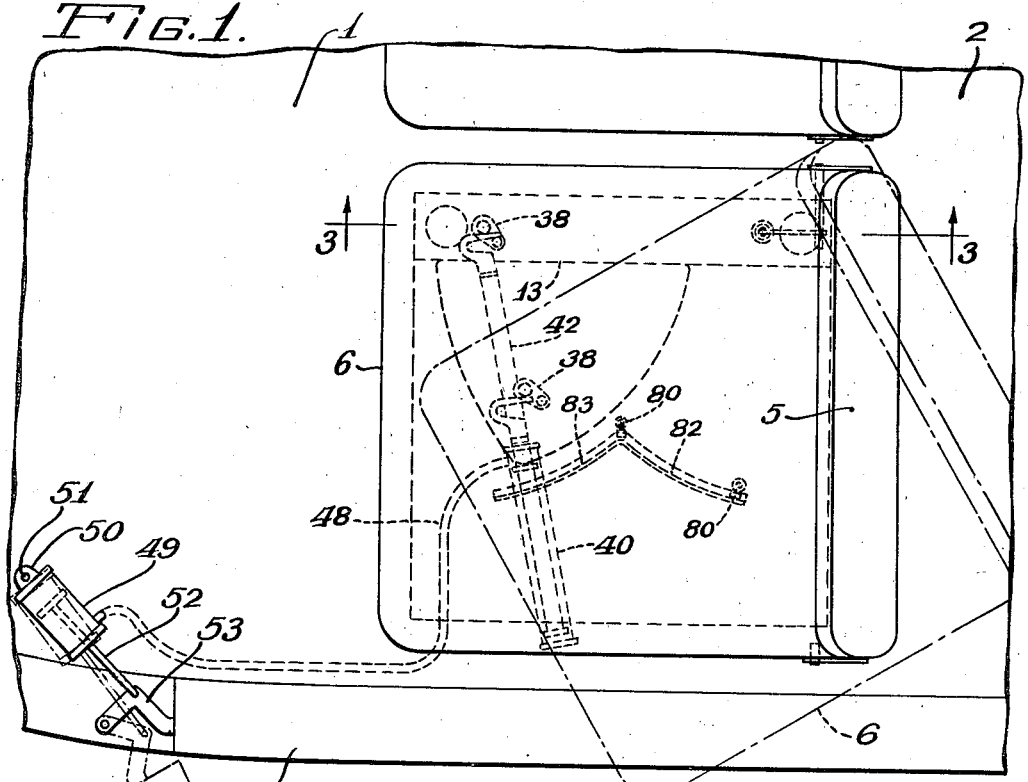
Fig. 1 is a top plan view of a portion of the front compartment of an automobile showing two positions of the improved swivel seat.
Figure 2:
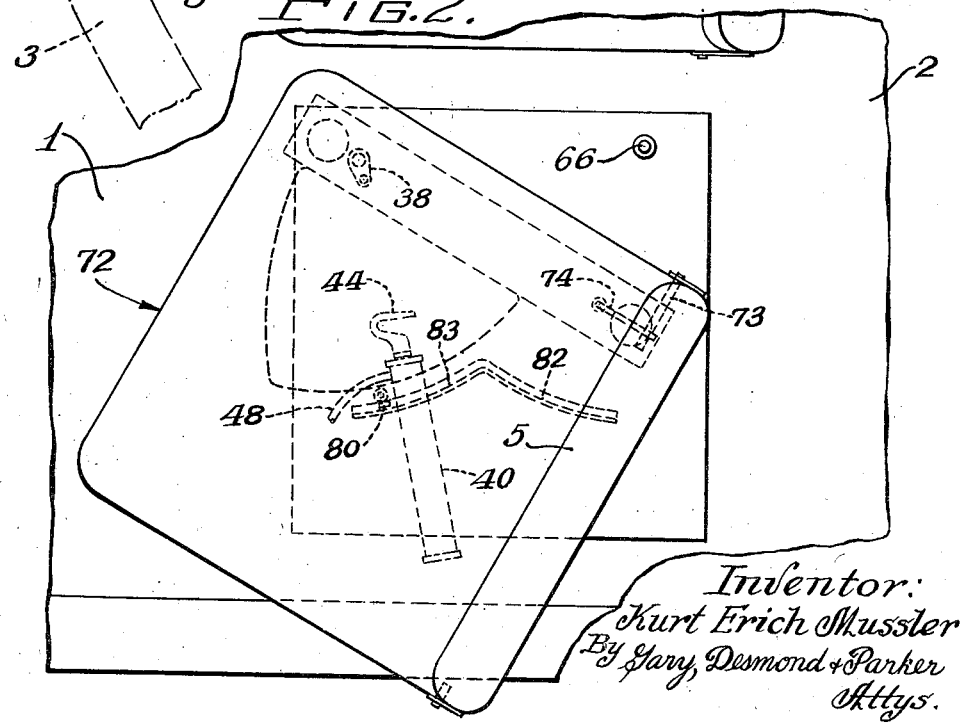
Fig. 2 is a similar view showing the swivel seat in a third position.

Referring in detail to the drawing, 1 indicates the front compartment of a conventional passenger automobile of the two-door or so-called "coach" type wherein a rear passenger compartment 2 is also provided. This type of automobile has two opposite side doors, one of which is illustrated in Figs. 1 and 2, at 3.

Although the invention is illustrated as applied to one front seat of the automobile, it is to be understood that it may be applied to one or both front seats, but inasmuch as the devices would be duplicates, as applied to both front seats, only one embodiment will be described. In addition, for purposes of clarity in illustration and description the seats of the automobile are shown in their structural form except in Figs. 3 and 4 wherein seat cushion 4 and back cushion 5 are shown in broken lines.

Referring particularly to Figs. 3, 4 and 5, the numeral 6 indicates an upper supporting plate for seat cushion 4. Plate 6 is carried, adjacent its rear inner corner upon swivel 7 comprising swivel shaft 8 having enlarged head 9, said shaft being embraced below plate 6 by space collar 10 preferably welded, as at 11 to the lower face of the plate. Swivel shaft 8 also extends through an aperture 12 provided in an end portion of connecting bar 13 which carries an upper spacer collar 14 embracing shaft 8 and abutting collar 10, collar 14 being preferably welded, as at 15, to the upper face of bar 13. A split washer 16 embraces the lower end portion of shaft 8 and engages in an annular groove 17 provided in said shaft, whereby cooperating in conjunction with the enlarged head 9, axial movement of the shaft 8 is prevented.

Bar 13 is disposed beneath and parallel to the inner edge portion of plate 6 and at its opposite end said bar carries a collar 18, preferably welded to said bar, as at 19. A front pivot shaft 20 extends through collar 18 and carries at its upper end an annular groove 21 in which a split washer 22 is removably engaged.

Beneath and spaced from bar 13, is a lower supporting plate 23 which is provided with an aperture 24 through which swivel shaft 20 extends. A spacer collar 25 embraces shaft 20 and is secured preferably by welding 26 to the upper face of plate 23, said spacer collar being in abutting relationship to collar 18 carried by bar 13. Shaft 20 carries an enlarged head 27 which, in cooperation with washer 22 prevents axial movement of shaft 20.

Lower supporting plate 23 may be maintained stationary within the front compartment 1 of the automobile. If, as is the case in many types of automobiles, mechanism (not shown) is employed to move the front seat forwardly, rearwardly, upwardly and downwardly, such mechanism will operate beneath, and act on, plate 23 to move said plate in the desired manner. However, in either case, the present invention may be employed since it operates independently of any other conventional seat-moving mechanism.

In the present invention, the arrangement is such that plate 6 may swing about swivel shaft 8, said plate swinging independently of bar 13 and plate 23, or plate 6 toegther with bar 13 may swing, as a unit, about swivel shaft 20. The means for carrying out the hereinbefore described movements will be hereinafter more fully described.

In normal driving position of the front seat, plate 6 is disposed above plate 23 in substantially vertical registration therewith and bar 13 is disposed between said plates along the inner side of said seat. A bushing 28 is carried by bar 13 adjacent shaft 20 said bushing being preferably secured by welding 29 to said bar. A cam block 30 is carried by plate 6 being preferably secured thereto by welding 31. The cam block 30 is provided with a central bore through which a cam shaft 32 is slidably and rotatably positioned. The cam shaft 32 is provided with a helical cam slot into which the end portion of a pin 34 extends, pin 34 being rigidly carried by the cam block 30. Cam shaft 32, adjacent its lower end, carries an annular bead 35 and a coil spring 36 embraces cam shaft 32 and is confined between bead 35 and the lower face of the cam block 30. An end portion 37 of the cam shaft 32 extends below bead 35 and, when the seat is in its normal driving position the end portion 37 extends into bushing 28 thereby latching bar 13 and plate 6 together. When the end portion 37 is in latching position plate 6 cannot be swung about swivel shaft 8 relative to bar 13.

An arm 38 is pinned by means of pin 39 to the upper end of cam shaft 32, the arrangement being such that when cam shaft 32 is turned, by means of arm 38, in a predetermined direction, the engagement of pin 34 in cam slot 33 will cause cam shaft 32 to move axially upwardly and the end portion 37 will be disengaged from bushing 28. The pitch of the helical cam slot 33 is such that when the applied turning moment is relieved from arm 38, spring 36 will move cam shaft 32 to its lowermost position.

A cylinder 40 is mounted upon the lower face of plate 23 and is rigidly secured thereto by means of screws or the like 41. The axis of cylinder 40 is in vertical alignment with the axis of cam shaft 32. A piston rod 42 is reciprocally movable in cylinder 40 and at its end portion said piston rod carries an upwardly extending arm 43, the arm at its upper terminus extending at right angles to its length and forming a hook 44. A pin 45 is carried by the arm 38 which is mounted upon the upper end of cam shaft 32 and at predetermined phases of the operation of the device the hook 44 engages with pin 45. As can readily be seen in Fig. 6, the outer edge portion of hook 44 is inclined as shown at 46 and the upper end of pin 45 is likewise inclined as shown at 47 in Fig. 6. The purpose of this construction will be hereinafter more fully described.

A flexible tube 48 connects at one end of cylinder 40, as shown best in Figs. 1 and 5. The opposite end of the tubing 48 connects into one end of a cylinder 49, said last mentioned cylinder carrying a lug 50 whereby said cylinder is pivotally mounted, as at 51, upon a portion of the floorboard of the automobile. A piston rod 52 is reciprocally movable in cylinder 49 and at its outer end connects with a hinge arm 53 upon which door 3 is carried.

The arrangement is such that when the door 3 is swung outwardly upon hinge 53, as indicated in dotted lines in Fig. 1, the piston rod 52 connected to the hinge 53 is moved outwardly from cylinder 49. Cylinders 49 and 40 are preferably filled with a hydraulic liquid and hence when piston rod 52 moves outwardly liquid under pressure is passed through tubing 48 and thus moves piston rod 42 inwardly with respect to cylinder 40. Assuming that prior to opening the door 3 the end portion 37 of cam shaft 32 is in engagement with bushing 28 and assuming further that hook 44 is in engagement with pin 45, it can readily be seen that when piston rod 42 moves inwardly toward cylinder 40, the initial motion imparted to arm 38 is to swing said arm into a vertical plane substantially in alignment with the axis of piston rod 42. In other words, cam shaft 32 is rotated. The rotation of cam shaft 32 causes said shaft to move axially upwardly and thus the end portion 37 of said shaft disengages from bushing 28. Continued motion of the piston rod 42 toward cylinder 40 causes a pulling action to be exerted upon pin 45 and said action results in rotation or swingable movement of plate 6 relative to bar 13, said plate swiveling about swivel shaft 8. It can readily be seen, with specific reference to Fig. 1, that when plate 6 is rocked relative to bar 13, said plate will eventually occupy the position shown in dotted lines in Fig. 1. In other words, by opening the door 3 plate 6 is swung about pivot shaft 8 and the seat 1 of which plate 6 comprises a part, including seat cushion 4 and back cushion 5 is swung outwardly with respect to the door opening. When the seat is thus swung, it can readily be seen that the operator's legs, while he remains in a seated position, are swung outwardly toward the door opening whereby his legs and feet may be positioned substantially over the ground adjacent the edge portion of the automobile and wherein he may very readily leave the automobile.

By specific reference to Fig. 1, it will be noted that piston rod 42 moves in substantially a straight line, that is, it moves along the axis of cylinder 40 which is rigidly secured to plate 23. However, it will be noted that plate 6 moves arcuately about swivel shaft 8 as a center. Hence, when piston rod 42 moves inwardly with respect to cylinder 40, cam shaft 32, arm 38 and pin 45 move inwardly toward swivel shaft 8 relative to the hook 44. The arrangement is such that when piston rod 42 is moved to its extreme inner position, pin 45 carried by arm 38 will so move relative to hook 44 that pin 45 will disengage itself from said hook. After pin 45 has thus been disengaged from hook 44, the seat which has been swung outwardly toward the door opening about the swivel shaft 8 may be manually returned to its normal position without the necessity of closing door 3. Upon the return movement of the seat to its normal position, cam shaft 32 will be in its lowermost position. To permit the end portion 37 of cam shaft 32 to reenter the bushing 28, a lateral edge portion 54 of plate 13 is bent downwardly so that the lower end of the cam shaft will ride upon the bent portion of the bar 13 and thus move the cam shaft axially upwardly until said shaft becomes positioned immediately above bushing 28, at which time, spring 36 causes the end portion 37 of the cam shaft to assume a latched position with respect to said bushing.

When the door 3 is closed while the cam shaft 32 is in latched position with respect to bushing 28, that is, while plate 6 is in its normal position, the fluid in the hydraulic system comprising cylinders 40 and 49 will be returned from cylinder 40 to cylinder 49 and hence piston rod 42 will be projected outwardly with respect to cylinder 40. When the hook 44 approaches pin 45, there is sufficient resiliency in piston rod 42, when the inclined surface 46 of the hook engages the end surface 47 of pin 45, to permit said hook to spring over the end of pin 45 and thus reengage the pin. The parts are then in a position to repeat the operation hereinbefore described when door 3 is opened.

In conventional two-door, coach type automobiles wherein passengers may be carried in the back seat, the passengers must enter and leave the rear compartment 2 through one of the two doors. In conventional automobiles of this type, the backs of the front seats are swingable a limited degree forwardly to facilitate such entry and departure. However, the space adjacent the floor of the compartment is more or less restricted and, hence, entry and departure through the space provided is more or less difficult particularly for stout or old people.

The present invention contemplates, in addition to the advantages hereinbefore described, provision for swiveling one or both front seats in a direction whereby entry and departure, to and from the rear compartment 2, is facilitated.

Referring particularly to Figs. 2 and 3, a bushing 55 is positioned in plate 6 adjacent swivel shaft 8. The bushing is preferably secured to said plate by means of welding 56. A latch operating pin 57 is slidably positioned in bushing 55, said pin terminating at its lower end in a hemispherical contact portion 58. A bead 59 is formed at the upper end portion of the actuating pin 57 and a coil spring 60 embraces the pin 57 and bears at its opposite ends against bead 59 and bushing 55. A flange 61 is formed upon the lower portion of pin 57 and restricts movement of the pin 57 with respect to bushing 55 whereby spring 60 will normally hold flange 61 in contact with the lower end of bushing 55.

A bushing 62 is positioned in plate 23, said bushing being provided with threads 63 at its lower end. A cup-shaped member 64 is adapted to engage the threads 63 whereby a compartment 65 is provided. A latch pin 66 is slidably positioned in bushing 62 and is urged in an upwardly direction by coil spring 67 positioned in compartment 65 at its lower portion and engageable in bore 68 in pin 66 at its upper portion. A flange 69 is carried by the lower end portion of pin 66 and the arrangement is such that coil spring 67 normally urges pin 66 upwardly with flange 69 limiting upward movement of the pin 66 with respect to the bushing. A bushing 70 is carried upon bar 13 and is rigidly secured thereto by welding 71.

When the parts are in their normal position, that is, when the seat is in normal driving position, bushings 55, 62 and 70 are in axial alignment and under the influence of spring 67, the upper end portion of latch pin 66 engages in bushing 70 whereby bar 13 is locked relative to plate 23. As will be hereinafter more fully described, when the latch operating pin 57 is depressed, the hemispherical end portion 58 thereof contacts the upper end of latch pin 66 thereby moving said patch pin downwardly against the compression of spring 67 and disengaging the latch pin from bushing 70. After latch pin 66 has been disengaged from bushing 70, bar 13 together with plate 6 may be rotated about swivel shaft 20. In view of the fact that the seat proper is carried upon plate 6, it can readily be seen that when plate 6 and bar 13 are thus moved about swivel shaft 20 the seat may be swung to a position shown at 72 in Fig. 2. When the seat is swung to this position it can readily be seen space is made available for entry and departure through the open doorway to and from the rear compartment 2.

In order to actuate the latch operating pin 57 the back of the front seat which carries cushion 5 is pivoted upon rod 73. Lever 74 is rigidly mounted at one end upon shaft 73 and the opposite end thereof terminates in finger portion 75 which bears upon the upper end of the latch operating pin 57. With the parts in their normal position, that is, when the seat is in normal driving position, the back of the front seat may be rocked in a counterclockwise direction about rod 73 as viewed in Fig. 3. Such rocking movement depresses the latch operating pin 57 whereby latch pin 66 may be disengaged from bushing 70 and the front seat may then be swung to the position shown at 72 in Fig. 2. A stop 74' may be mounted upon plate 6 in the path of travel of lever 74, said stop functioning to limit the swingable movement of lever 74 when the back of the front seat is swung forwardly.

To exemplify the entire operation of the device, it will be assumed that the automobile comes to a stop and passengers in both the front seats and rear seats wish to leave the respective compartments 1 and 2. The first operation involves the opening of the door 3 whereby the front seat may be swung to the position shown in Fig. 1 in the manner hereinbefore described. This permits exit of the passenger occupying the front seat. The front seat may then be manually moved to normal driving position. When the seat is in this position the occupant of the rear compartment 2 may then rock the back of the front seat forwardly whereby latch 66 will be disengaged from bushing 70 and plate 6 and bar 13 may be swung about swivel shaft 20. In this fashion the front seat may be swung to the position illustrated at 72 in Fig. 2 and hence adequate space is provided for the exit of the occupant of the rear compartment. The front seat may then be manually swung to its normal position whereby latch pin 66 will reengage with bushing 70. After the door 3 has been closed, hook 44 reengages with pin 45 and hence when the operator returns and opens the door 3 the seat will be swung to the position shown in Fig. 1 whereby the operator can conveniently seat himself upon the seat and manually swing himself into the automobile. If passengers are to occupy the rear compartment, after the door has been initially opened, the front seat may be swung to its normal driving position. The back of the front seat may then be rocked to permit movement of the seat to the position shown at 72 in Fig. 2 whereby the passengers may enter the rear compartment 2. The front seat may then be swung to its normal position and inasmuch as the door is still open, the seat may be manually swung to the position shown in Fig. 1 whereby the occupant of the front compartment 1 may conveniently seat himself and swing into the front compartment while in seated position.

To provide adequate support for the intermediate portion of the seat during the swinging operations hereinbefore described, a track 76, shown in detail in Fig. 7, is mounted upon the lower plate 23. The track 76 carries a flange 77 which extends outwardly at right angles to said track. A rod 78 is positioned on plate 6 and extends downwardly therefrom, said rod terminating at its lower portion in a block 79 which carries spaced upper and lower rollers 80 and 81 respectively, said rollers being adapted to engage the upper and lower surface of the flange 77. The track 76 is formed in two arcuate sections illustrated particularly at 82 and 83 in Fig. 5. When the seat is swung about swivel shaft 8, the rollers 80 and 81 engage flange 77 carried upon that section of the track designated by the reference numeral 82. When the seat is swiveled about swivel shaft 20, the rollers 80 and 81 engage the flange 77 carried by that section of the track 76 designated by the reference numeral 83. In this fashion the intermediate portion of the seat is supported and guided during its swingable movement about both swivel shafts 8 and 20. As additional support for the seat, a ball 80' may be carried adjacent pivot 7, said ball resting on, and being adapted to roll upon the subplate 23.

It is apparent that herein is provided a front seat for an automobile which is carried by a double swivel whereby passengers entering or leaving the front or rear compartments of an automobile may do so with the greatest of convenience.

I claim as my invention:

1. A swiveling mechanism for the front seat of an automobile having a front door, which comprises, a supporting plate carried in the passenger compartment of an automobile to support the front seat, a bar positioned beneath and substantially parallel to said plate, an immovable subplate carried in said passenger compartment and positioned beneath said bar, means connecting said bar to said subplate, a swivel shaft connecting a portion of said supporting plate to a portion of said bar whereby said supporting plate may be swung upon said bar, disengageable latching means a portion of which is carried by said supporting plate and a portion of which is carried by said bar in spaced relationship to said swivel shaft for removably engaging said supporting plate and said bar, and means for connecting that portion of the latching means carried by said supporting plate to the front door of an automobile to unlatch said latching means and swing the supporting plate relative to said bar when said door is opened.

2. A swiveling mechanism for the front seat of an automobile having a front door, which comprises, a supporting plate carried in the passenger compartment of an automobile to support the front seat, a bar positioned beneath and substantially parallel to said plate, an immovable subplate carried in said passenger compartment and positioned beneath said bar, means connecting said bar to said subplate, a swivel shaft connecting a portion of said supporting plate to a portion of said bar whereby said supporting plate may be swung upon said bar, disengageable latching means a portion of which is carried by said supporting plate and a portion of which is carried by said bar in spaced relationship to said swivel shaft for removably engaging said supporting plate and said bar, and hydraulic piston and cylinder means for connecting that portion of the latching means carried by said supporting plate to the front door of an automobile to unlatch said latching means and swing the supporting plate relative to said bar when the door is opened.

3. A swiveling mechanism for the front seat of an automobile having a front door, which comprises, a supporting plate carried in the passenger compartment of an automobile to support the front seat, a bar positioned beneath and substantially parallel to said plate, an immovable subplate carried in said passenger compartment and positioned beneath said bar, means connecting said bar to said subplate, a swivel shaft connecting a portion of said supporting plate to a portion of said bar whereby said supporting plate may be swung upon said bar, disengageable latching means a portion of which is carried by said supporting plate and a portion of which is carried by said bar in spaced relationship to said swivel shaft for removably engaging said supporting plate and said bar, and means for connecting that portion of the latching means carried by said supporting plate to the front door of an automobile to unlatch said latching means and swing the supporting plate relative to said bar when the door is opened, said connecting means comprising hydraulic piston and cylinder means the cylinder thereof being immovably positioned beneath said supporting plate, means carried by the piston engaging the portion of the latch carried by the supporting plate whereby movement of said piston relative to said cylinder in one direction disengages said latch and swings said supporting plate relative to said bar, and hydraulic piston and cylinder means for connection to said front door and connected to said first-mentioned piston and cylinder means for actuating said last-mentioned piston to unlatch said latch and swing said supporting plate when said door is opened.

4. A swiveling mechanism for the front seat of an automobile which comprises, a supporting plate carried in the passenger compartment of an automobile to support a front seat, a bar positioned beneath and substantially parallel to said plate, a swivel shaft pivotally connecting a portion of said plate to a portion of said bar, an immovable subplate carried in said passenger compartment and positioned beneath said bar, a second swivel shaft pivotally connecting said bar to said subplate and spaced from said first-mentioned swivel shaft, disengageable latching means carried by said supporting plate and said bar, and disengageable latching means carried by said bar and said subplate, means carried in said passenger compartment for actuating said first-mentioned latching means to unlatch said supporting plate and bar to permit swinging of said supporting plate relative to said bar, and means carried in said passenger compartment for actuating said second-mentioned latching means to unlatch said bar and said subplate to permit swinging of said supporting plate and bar relative to said subplate.

5. A swiveling mechanism for the front seat of an automobile having a front door which comprises, a supporting plate carried in the passenger compartment of an automobile to support a front seat, a bar positioned beneath and substantially parallel to said plate, a swivel shaft pivotally connecting a portion of said plate to a portion of said bar, an immovable subplate carried in said passenger compartment and positioned beneath said bar, a second swivel shaft pivotally connecting said bar to said subplate and spaced from said first-mentioned swivel shaft, disengageable latching means carried by said supporting plate and said bar, and disengageable latching means carried by said bar and said subplate, means carried in said passenger compartment for connecting the front door of the automobile and said first-mentioned disengageable latching means for actuating said first-mentioned latching means to unlatch said supporting plate and bar and to swing said supporting plate relative to said bar when said door is opened, and means carried in said passenger compartment for actuating said second-mentioned latching means to unlatch said bar and said subplate to permit swinging of said supporting plate and bar relative to said subplate.

6. A swiveling mechanism for the front seat of an automobile which comprises, a supporting plate carried in the passenger compartment of an automobile to support a front seat, a back pivotally mounted upon said front seat, a bar positioned beneath and substantially parallel to said plate, a swivel shaft pivotally connecting a portion of said plate to a portion of said bar, an immovable subplate carried in said passenger compartment and positioned beneath said bar, a second swivel shaft pivotally connecting said bar to said subplate and spaced from said first-mentioned swivel shaft, disengageable latching means carried by said supporting plate and said bar, and disengageable latching means carried by said bar and said subplate, means carried in said passenger compartment for actuating said first-mentioned latching means to unlatch said supporting plate and bar to permit swinging of said supporting plate relative to said bar, and lever means carried by said seat back and in contact with said second-mentioned latching means to unlatch said bar and said subplate when said seat back is rocked about its pivots to permit swinging of said supporting plate and bar relative to said subplate.

7. A swiveling mechanism for the front seat of an automobile having a front door which comprises, a supporting plate carried in the passenger compartment of an automobile to support a front seat, a back pivotally mounted upon said front seat, a bar positioned beneath and substantially parallel to said plate, a swivel shaft pivotally connecting a portion of said plate to a portion of said bar, an immovable subplate carried in said passenger compartment and positioned beneath said bar, a second swivel shaft pivotally connecting said bar to said subplate and spaced from said first-mentioned swivel shaft, disengageable latching means carried by said supporting plate and said bar, and disengageable latching means carried by said bar and said subplate, means carried in said pssenger compartment for connecting said door and said first-mentioned disengageable latching means for actuating said first-mentioned latching means to unlatch said supporting plate and bar and to swing said supporting plate relative to said bar when the door is opened, and lever means carried by said seat back and in contact with said second-mentioned latching means to unlatch said bar and said subplate when said seat back is rocked about its pivot to permit swinging of said supporting plate and bar relative to said subplate.

References Cited in the file of this patent

UNITED STATES PATENTS

| | | |
|---|---|---|
| 999,283 | White | Aug. 1, 1911 |
| 1,484,229 | Miles | Feb. 19, 1924 |
| 1,682,989 | Smelker | Sept. 4, 1928 |
| 1,942,070 | Smelker | Jan. 2, 1934 |
| 2,587,679 | Atkinson | Mar. 4, 1952 |
| 2,694,439 | Murray | Nov. 16, 1954 |